April 12, 1949.  W. K. LONG  2,466,958
PORTABLE VISION TEST CHART ILLUMINATOR
Filed Aug. 21, 1945  3 Sheets-Sheet 1
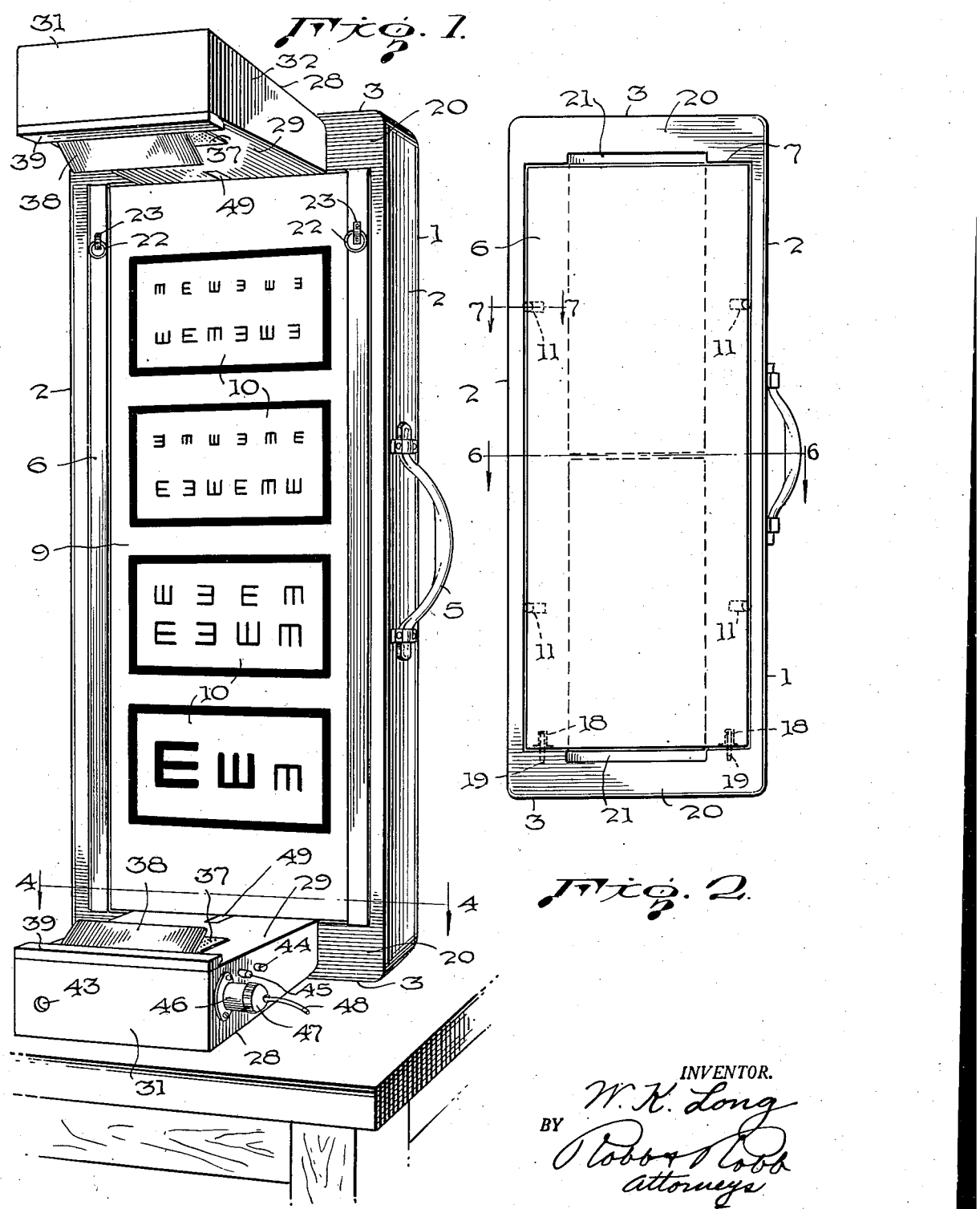

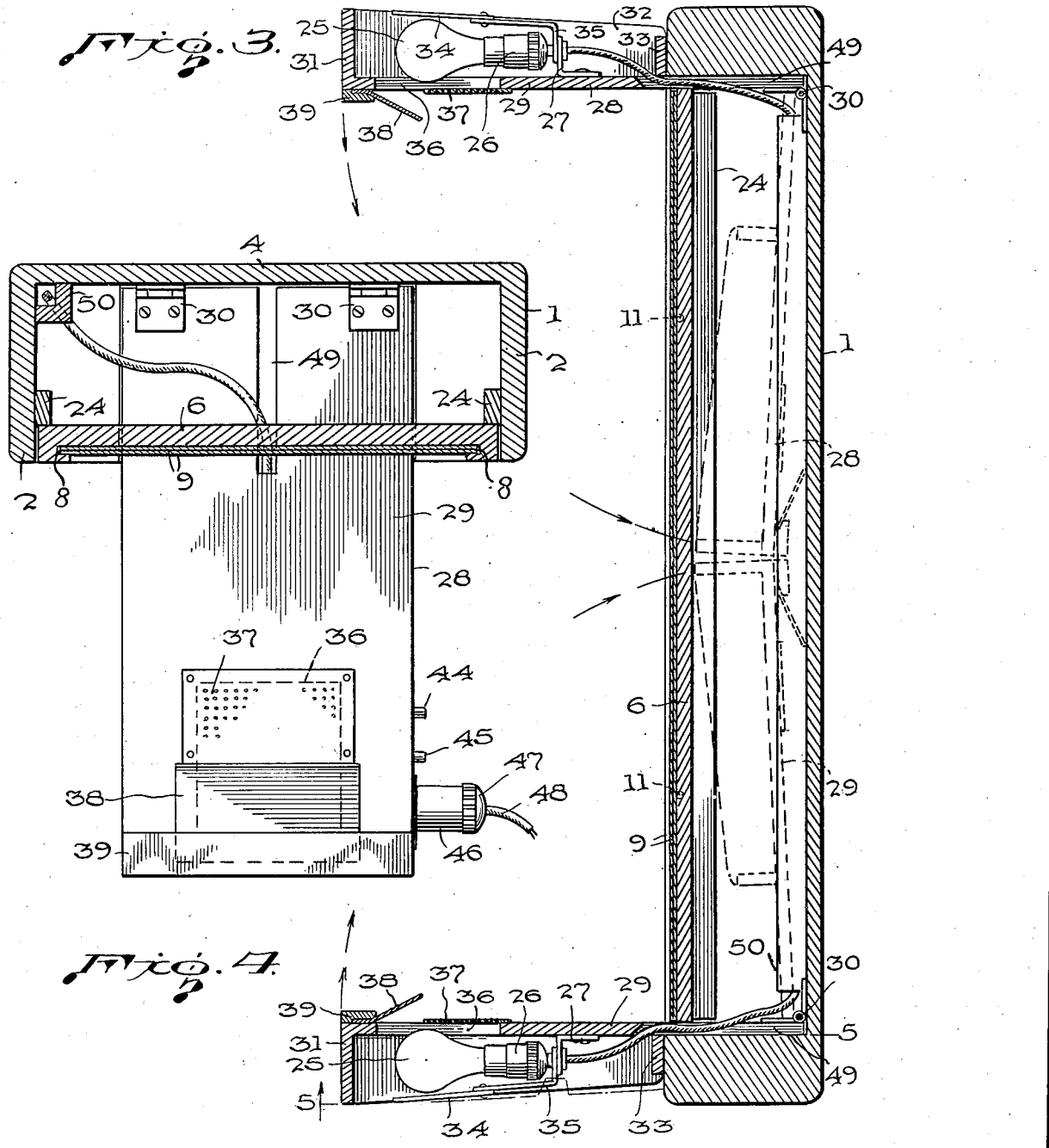

April 12, 1949.    W. K. LONG    2,466,958
PORTABLE VISION TEST CHART ILLUMINATOR
Filed Aug. 21, 1945    3 Sheets-Sheet 3
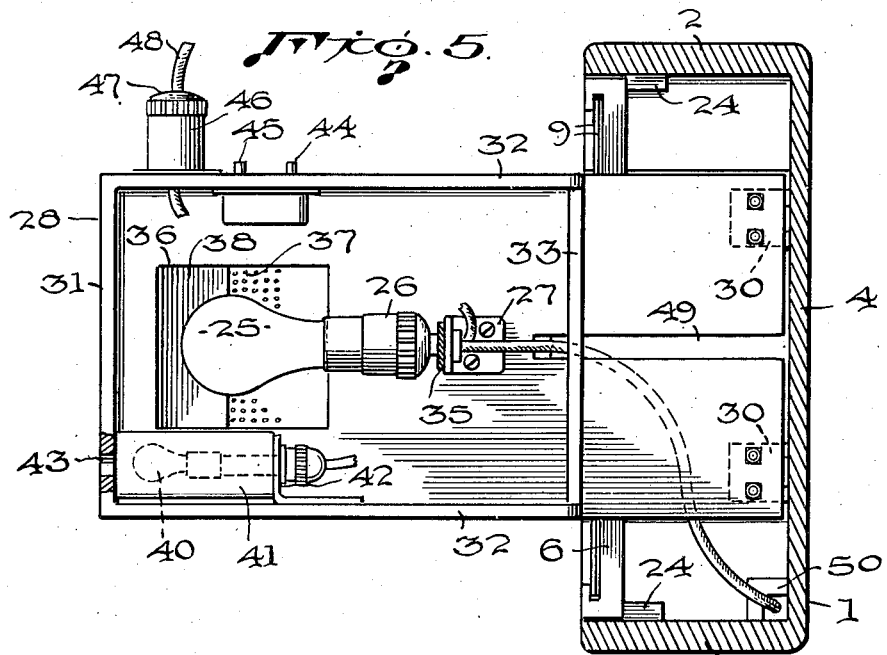
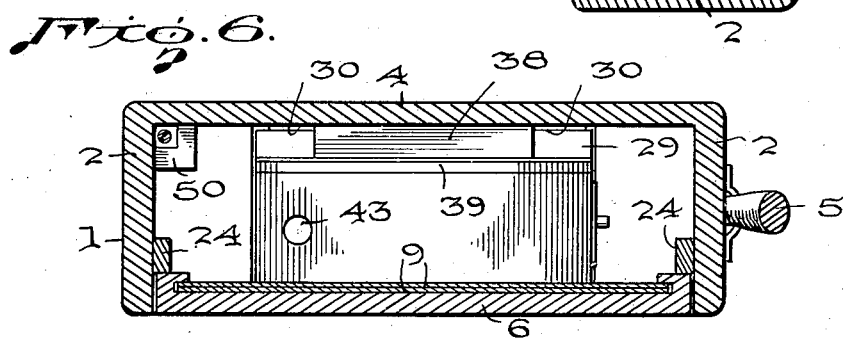
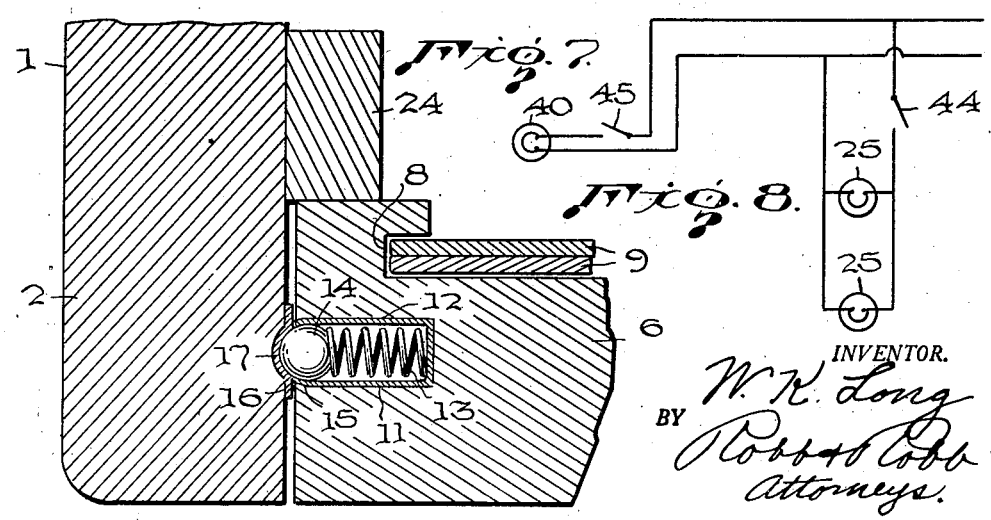

Patented Apr. 12, 1949

2,466,958

UNITED STATES PATENT OFFICE 2,466,958

PORTABLE VISION TEST CHART ILLUMINATOR

Walter K. Long, Auburn, N. Y., assignor, by mesne assignments, to Welch Allyn, Inc., Auburn, N. Y., a corporation of New York Application August 21, 1945, Serial No. 611,845

17 Claims. (Cl. 40—132)

1

The present invention relates to vision test charts, and more especially, to illuminating means for such charts.

The primary object of the invention is to provide a vision test chart illuminator having the form of a compact, light-weight, portable kit which is especially applicable to use for visual acuity tests in schools, factories, and similar places, but it is to be understood that it is not confined to such uses, since it is equally applicable to use in the private practice of physicians, optometrists, oculists, and others.

A further object of the invention is to provide a vision test chart illuminator which assures adequate and uniform illumination of the chart, with the illumination properly directed and remaining constant at a standard intensity.

Another object of the invention is to provide a portable vision test chart illuminator which, when not in use, has the form of a compact case or valise in which the charts, illuminating lamps, and other accessories, are housed and fully protected against damage and maintained free from dust, and also facilitating storage as well as ease of handling.

A still further object of the invention is to provide a portable vision test chart illuminator in which the illuminating means includes a pair of electric lamps mounted on shiftable lamp supports, said lamp supports in one position being disposed substantially perpendicular to the chart at the top and bottom respectively thereof, and in another position, being disposed behind the chart and housed in a carrying case to which the lamp supports are hingedly connected, such carrying case serving as a main support for the chart and lamps, and adapted to be rested on one end when the chart is in use, with the chart mounted on the front of the case in an upright position between the lamp supports, and the lamp supports extending forwardly from the case at the front of the chart.

Other and further objects and advantages of the invention will be hereinafter described, and the novel features thereof defined by the appended claims.

In the drawings:

Figure 1 is a perspective view of a vision test chart illuminator constructed in accordance with the invention, and showing the carrying case, the chart, and the lamp supports in the respective positions which they occupy when the chart is to be used;

Figure 2 is a view in front elevation of the illuminator in a condition ready for carrying or storage, with the lamp supports folded into the carrying case, as shown in broken lines, and with the chart frame reversed so as to dispose the chart within the carrying case, with the chart frame forming a cover for the carrying case;

Figure 3 is a vertical sectional view showing, in full lines, the illuminator in its condition ready for use, and in broken lines, in its collapsed condition;

Figure 4 is a horizontal sectional view taken on the line 4—4 of Figure 1;

Figure 5 is a sectional view taken on the line 5—5 of Figure 3;

Figure 6 is a sectional view taken on the line 6—6 of Figure 2;

Figure 7 is an enlarged detail sectional view taken on the line 7—7 of Figure 2, showing the details of the spring-pressed detents; and Figure 8 is a wiring diagram of the electric lamp circuits.

Like reference characters designate corresponding parts in the several figures of the drawings, wherein 1 generally denotes a hollow case composed of rigid side walls 2, 2, end walls 3, 3, and a back wall 4. These walls may be formed of any suitable material, such as plywood, fiber, or other relatively rigid material, and are preferably covered with a finishing material, such as simulated leather or the like. A handle 5 is attached to one of the side walls 2 so as to provide a convenient means for handling and carrying the case. As clearly shown in the drawings, the case 1 is of substantially greater length than width, and is of appreciable depth.

The front of the case is provided with a removable, reversible, flat cover 6 which loosely fits in the rectangular opening 7 formed by the respective walls of the case, and on one side of the cover, the opposite marginal edges are formed with longitudinally extended grooves 8, 8 in which a chart 9 is adapted to be slidably mounted endwise, said chart being formed of cardboard or other relatively stiff material and having depicted thereon one or more groups of test symbols, as indicated at 10. The chart illustrated in the drawings is known as the Snellen Illiterate E Chart, which is one form of chart that is particularly applicable to the testing of the eyes of children and minimizes the possibility of memorizing the chart. It is to be understood, however, that any other suitable symbols may be substituted for those illustrated herein.

The grooves 8 in the cover 6 are preferably made of sufficient depth to accommodate at least two charts, one superposed on the other, as illustrated in Figure 7 of the drawings, and the charts may be readily interchanged by sliding the same endwise in the grooves 8 and placing the one that is to be used so that it lies upon the other, as will be obvious. Thus, when the cover 6 is mounted in the opening 7 of the case 1 with the charts facing outwardly, the cover 6 serves as a supporting frame for the charts, and by standing the case 1 on end, as illustrated in Figure 1 of the drawings, the charts are rigidly held in an upright position ready for use. By reversing or inverting the cover 6 and replacing it in the opening 7 of the case 1, the charts will then be disposed at the inside of the cover so that they are completely housed within the case, and are fully protected against damage.

Any suitable means may be employed to releasably connect the cover 6 to the case 1, and for this purpose, I preferably provide a plurality of spring-pressed detents generally designated 11, arranged in spaced relation to each other at the opposite edges of the cover and case. Each of these detents includes a sleeve or socket 12 which may be formed of metal and which is recessed in the edge of the cover 6. A helical spring 13 is mounted in each socket 12, with the inner end of the spring resting upon the inner end of the socket. At the outer end of each socket there is arranged a spherical member or ball 14 which is seated against the outer end of the spring 13 so as to be normally urged by the spring in an outward direction relative to the socket, with at least a portion of the ball 14 projecting beyond the outer end of the socket. In order to prevent the ball from being accidentally displaced from the socket, the outer end of the socket is restricted at 15, so that the diameter of the socket at this end is slightly less than the diameter of the ball 14. Mounted on the marginal walls of the carrying case opposite to each socket and ball 14 is a coacting plate 16 having its central portion recessed or depressed, as indicated at 17, to form a seat for the ball 14. The action of these spring-pressed balls will be obvious from the foregoing, and it will be understood that as the cover 6 is applied into the opening 7 of the carrying case 1, the balls 14 will yield inwardly until they align with the depressed seats 17 in the marginal edges of the case, at which time, the balls will be urged with a substantial pressure into the seats 17, which pressure is sufficient to hold the cover in place, while at the same time, leaving the balls free to yield inwardly when an outward pull is exerted on the cover 6 to remove the same from the case 1.

To facilitate the mounting of the cover 6 on the case 1, the lower end of the cover is preferably provided with a pair of sockets 18, 18, which are respectively recessed in the edge of the cover adjacent to the opposite corners thereof. These sockets 18, 18 coact with fixed pins 19, 19, which are mounted on the case 1 and project into the sockets 18, 18 when the cover 6 is applied to the case, as best illustrated in Figure 2 of the drawings.

As will be seen from Figure 2, the cover 6 is somewhat shorter than the longitudinal dimension of the case 1, and accordingly, the front side of the case is extended inwardly, as at 20, 20, from its extreme ends at the top and bottom of the case, these extensions being a unitary part of the body of the case. Each extension 20 is formed with a laterally extended recess 21 at the upper and lower edges respectively of the cover 6. The primary purpose of these recesses 21, 21 will be hereinafter more fully described, but it may be mentioned at this point that the recesses are of sufficient depth to enable the finger-tips of the user or operator to be inserted in the upper recess 21 so that an outward pressure may be applied to the upper end of the cover 6 in removing the cover when the case is closed in a position ready for carrying or for storage, as shown in Figure 2. On the other hand, when the cover 6 is reversed, with the charts 9 facing outwardly, removal of the cover may be accomplished with the aid of suitable pull members 22 which may have the form of small rings or loops which are anchored to the opposite edges of the cover 6 near the top thereof by suitable brackets 23 which allow the rings to normally lie flat against the cover, but which are free to swing away from the cover so that they can be more readily grasped by the fingers. In order to prevent the cover 6 from being inadvertently forced into the case 1 beyond a point at which the spring-pressed detents or balls 14 will engage with their seats 17, in either of the reversed positions of the cover, the opposite side walls 2, 2 of the case are each provided with longitudinally extended strips or moldings 24 which are fixed thereto in inwardly spaced relation to the front of the case, and against which strips the cover 6 seats, with the detents in properly registering positions respecting the seats 17.

Referring now more particularly to Figures 3 to 5 of the drawings, it will be seen that suitable provision is made for illuminating the charts 9 when in use, such illuminating means including a pair of electric lamps 25, 25. Each lamp 25 is mounted in a socket 26 which in turn is attached to a bracket 27, and the bracket in turn is fixed to a hinged support generally designated 28, there being one such support for each lamp. Each of said supports 28 includes a flat, rigid panel 29 of substantial width, and these respective panels are hingedly connected by hinges 30 at their inner ends adjacent to the upper and lower ends of the case 1, at the inside of the case, as will be best seen from reference to Figures 3 and 5. When so mounted, the panels 29 are free to swing outwardly and inwardly of the case, as indicated by the arrows in Figure 3, and when swung to their outward horizontal positions, as represented in full lines in this figure, the panels will be seated in the respective recesses 21 previously referred to, and will extend forwardly from the case 1 for a substantial distance beyond the front of the case, with the lamps 25 positioned forwardly of the charts 9. To enable such outward swinging movement of the lamp supports 28, the cover 6 must, of course, be first removed from the case 1, following which, the cover is reapplied to the case, with the charts 9 facing outwardly. When so reapplied, the cover engages beneath the upper lamp support and against the upper side of the lower lamp support and positively restrains both lamp supports against rocking or inwardly swinging movement, and the lamp supports will be rigid with the case 1 so that, when the case is rested on end, the lower lamp support assists in sustaining the assembly in an upright position.

To further aid in reinforcing the respective panels 29 of the lamp supports 28, 28, as is essential to the maintenance of a properly directed and constant source of light, each panel 29 is preferably provided at its free end with an upstanding end wall 31 extending transversely across the same, side walls 32, 32 at opposite sides thereof, and a transverse wall 33 which is sufficiently spaced outwardly from the hinged end of the panel 29 so as to clear the front of the case 1, when the lamp supports 28 are swung outwardly to their extended positions. The side walls 32, 32 may, if desired, be of progressively less height from their outer ends to their inner ends, but in the zone of the lamps 25 they are preferably of as great a height, or slightly greater, than the height of the extreme upper and lower edges of the lamps. The further advantage of this arrangement of the walls 31 and 32 is that they form shields about the respective lamps, when the latter are extended to their operative positions, thus preventing the light rays from being projected forwardly towards the observer.

In order to shield the lamps against the projection of light rays above and below the upper and lower lamps respectively, and to reduce the radiation of heat from the lamps, particularly the lower lamp, there is provided over each lamp an asbestos shield 34 which may be conveniently attached to a supporting bracket 35, which in turn is attached to the lamp supporting bracket 27, as best shown in Figure 3 of the drawings.

In order to project the light rays from the lamps 25, 25 onto the charts 9, the respective panels 29, 29 are each provided with an opening 36 in register with the lamp. Across these respective openings, there is provided a perforated screen 37 which terminates at its forward edge somewhat short of the forward end of the opening 36. The purpose of these perforated screens 37 is to produce a uniform distribution or diffusion of the light rays over the charts 9. At the front of each opening 36 and forwardly spaced from the perforated screen 37, there is provided an inclined baffle 38 which is attached to the forward edge of the respective panels 29, as by means of a molding strip or bead 39. These baffles 38 serve to prevent the light rays from being projected forwardly towards the observer, and confine the light rays to projection in a rearwardly direction towards the charts 9.

Referring particularly to Figure 5, it will be seen that one of the hinged lamp supports, preferably the lower one, is additionally provided with a small auxiliary lamp designated 40. This lamp 40 is enclosed in a case or housing 41 which is attached, as by means of a bracket 42, to one of the side walls 32 of the lamp support 28. The front wall 31 of this support 28 is provided with a small opening 43 in register with the lamp 40, thereby producing a small spot of light towards which the eyes of the observer may be directed in the course of the eye test. This spot of light is commonly termed a fixation light and is generally used as a part of the eye test employing the charts 9, but not simultaneously with that portion of the test which requires the use of the charts. Thus, it is desirable to provide means for controlling the interruption and energization of the lamps 25, 25 and the fixation lamp 40 independently of each other. To this end, there are preferably provided on one of the lamp supports 28, such as the lower lamp support, two switches respectively designated 44 and 45, one of which, for example, the switch 44, controls the lamps 25, 25, and the other of which, for example, the switch 45, controls the lamp 40. Adjacent to these switches is mounted a plug or receptacle 46 to which may be applied a connector 47 on the end of an extension cord 48 which may be connected to any convenient source of electrical supply, such as a wall outlet or receptacle. The circuits for the respective lamps and switches are diagrammatically illustrated in Figure 8 of the drawings. The wiring of the lamp and switch circuits is so arranged that it permits the lamp supports 28, 28 to be freely swung to and from their extended positions, and to this end, each of the panels 29 of the respective lamp supports 28 is slotted at 49, with the slots located centrally of the panels and extending from their inner hinged edges to a point somewhat in advance of the transverse wall 33. Thus, the wires leading from the lamps and switches on the respective panels may be passed through these slots 49 and into the case 1 where they may be run through a fixed conduit or housing 50 provided in one corner of the case next to the rear wall thereof, as best illustrated in Figures 3 to 6 inclusive.

The operation of the test chart illuminator will be readily understood from the foregoing and may be briefly summarized as follows. Assuming the case 1 is in its closed condition, as shown in Figure 2 of the drawings, the case may be conveniently carried by the handle 5 to the point at which the eye tests are to be made. The initial step in setting up the charts for use is to first remove the cover 6. Thereupon, the lamp supports 28, 28 are swung from their housed or retracted positions, shown in broken lines in Figure 3 of the drawings, to their outwardly extended positions, as shown in full lines in this same figure, whereupon the cover 6 is reapplied to to the case in an inverted position, that is, with one of the charts 9 facing outward. The case 1 may then be rested on end upon a table, desk, or other suitable support, and will assume an upright position for observation by an observer located at the required distance from the chart. After plugging in the extension cord 48 to connect the illuminator device to a suitable wall outlet or the like, the switch 44 is then manipulated to its circuit-closing position, causing illumination of the lamps 25, 25, from which the light rays are directed upon the chart 9 under a condition of constant and scientifically correct intensity and distribution of the light. As the eye test of the observer proceeds, the lamps 25, 25 may be turned off at will, and the fixation lamp 40 may be energized at any time convenient to the examiner by manipulating the switch 45 to its circuit-closing position. Upon completion of the examination, the extension cord 48 is first detached from the plug 46, following which the cover 6 is removed by pulling outwardly on the rings 22, 22. Thereafter, the lamp supports 28, 28 may be swung inwardly into the case 1 to restore the same to their normally retracted position, whereupon the cover 6 is replaced on the case with the charts facing inwardly of the case and fully housed therein along with the lamp supports and lamps. When the illuminator has been folded up and closed as described, all parts thereof are fully protected against damage and collection of dirt and dust, and the illuminator is ready to be carried to another point of use or stored away as desired. Thus, the illuminator constitutes a complete, portable, compact, lightweight and efficient test kit which may be used not only by skilled technicians or diagnosticians, but also by others of lesser degrees of skill with the aid of a very few and simple constructions particularly directed to the detection of defects which are the common causes of eye strain.

While the specific details have been herein shown and described, the invention is not confined thereto as changes and alterations may be made without departing from the spirit thereof as defined by the appended claims.

I claim:

1. A vision test chart illuminator, comprising a hollow case having a removable cover member at one side thereof, means on said cover member for engaging and supporting a vision test chart on one face thereof, said cover member being selectively attachable to the case in reversed positions, with the chart disposed within the case in one of the positions, and with the chart exposed and facing outwardly of the case in the other position, and illuminating means movably connected to and supported by the case for illuminating said chart in its latter position, said illuminating means being movable from a position normally enclosed within the case and behind the cover and chart, to an extended illuminating position in front of the chart.

2. Apparatus as defined in claim 1, wherein the removable cover member is held in its respectively reversed positions by holding means common to the respective positions.

3. Apparatus as defined in claim 1, wherein the removable cover member is held in its respectively reversed positions by yieldable detent means common to the respective positions.

4. Apparatus as defined in claim 1, wherein the case is of generally rectangular form, and the cover member is flat and of a size to fit within the marginal walls of the case in both of its selectively reversed positions, in combination with holding means on the cover member and case, respectively, for mutual engagement to hold the cover member in its reversed positions as aforesaid.

5. Apparatus as defined in claim 1, wherein the illuminating means comprises an electric lamp mounted on an elongated panel member adjacent to one end of the panel member, and the panel member is hingedly connected at its opposite end to the case and is engageable with the cover member when the panel member is swung to its extended position to maintain the panel member in said extended position.

6. Apparatus as defined in claim 1, wherein the illuminating means comprises an electric lamp mounted on an elongated panel member adjacent to one end of the panel member, and the panel member is hingedly connected at its opposite end to the case, said panel member being movable with the lamp from a folded position enclosed within the case to an extended position substantially perpendicular to the cover member, and said cover member being engageable with the panel member when so extended to hold the panel member and lamp in extended position.

7. Apparatus as defined in claim 1, wherein the illuminating means comprises an electric lamp mounted on an elongated panel member adjacent to one end of the panel member, and the panel member is hingedly connected at its opposite end to the case, said panel member being flat and rigid, and having marginal walls upstanding therefrom and surrounding the lamp, and also having an opening provided therein in register with the lamp and through which the light rays from the lamp are directed onto the face of the chart.

8. A vision test chart illuminator, comprising a hollow case having a removable cover member at one side thereof, means for detachably securing the cover member to the case in respectively reversed positions, means on the cover member for removably mounting a chart thereon so that when so mounted, the chart may be selectively positioned facing inwardly and outwardly of the case on reversal of the position of the cover member, illuminating means comprising a pair of lamp supports pivotally connected to the case within the same and located respectively at opposite ends of the case, a lamp mounted upon each of said lamp supports and movable therewith from a retracted position within the case to an extended position disposing the lamps outwardly of the case, and said removable cover member occupying a position between the lamp supports and having abutting engagement therewith, when the lamp supports are in their extended positions, for maintaining said lamp supports and lamps in their extended positions.

9. Apparatus as defined in claim 8, wherein each lamp support has the form of a flat panel member projecting forwardly from the case in substantially perpendicular relation to the cover member and the chart thereon when the lamp support is in its extended position.

10. Apparatus as defined in claim 8, wherein each lamp support has the form of a flat panel member projecting forwardly from the case in substantially perpendicular relation to the cover member and the chart thereon when the lamp support is in its extended position, and the case is recessed at its ends to form a space between the opposite ends of the cover member and the adjacent ends of the case, through which space the panel member projects from the interior of the case to a point substantially forwardly spaced from the front of the case.

11. Apparatus as defined in claim 8, wherein each lamp support has the form of a flat panel member projecting forwardly from the case in substantially perpendicular relation to the cover member and the chart thereon when the lamp support is in its extended position, and the respective panel members having the lamps mounted thereon so that one lamp is disposed above the upper side of the upper panel member and the other lamp is disposed below the lower side of the lower panel member when the panel members are in their extended positions and the case is rested on one end, said panel members having openings therein through which the light rays from the respective lamps are directed onto the chart when the panel members are extended.

12. Apparatus as defined in claim 8, wherein one of the lamp supports assumes a position when extended to coact with the corresponding end of the case to maintain the case with its cover and chart in an upright position when rested on the latter end, said lamp support having an opening therethrough for directing the light rays from the lamp onto the chart.

13. Apparatus as defined in claim 8, wherein the lamps on the respective lamp supports are disposed above and below the respective supports when extended, and each support is provided with an opening therethrough for directing the light rays from the lamps onto the chart at the front of the case.

14. Apparatus as defined in claim 8, wherein the lamps on the respective lamp supports are disposed above and below the respective supports when extended, and each support is provided with an opening therethrough for directing the light rays from the lamps onto the chart at the front of the case, each of said openings having a perforated screen mounted across the same and covering at least a portion of the area of said opening.

15. Apparatus as defined in claim 8, wherein the lamps on the respective lamp supports are disposed above and below the respective supports when extended, and each support is provided with an opening therethrough for directing the light rays from the lamps onto the chart at the front of the case, each of said openings having a perforated screen mounted across the same and covering at least a portion of the area of said opening, and each of said openings being provided at the forward edge thereof with an inclined baffle extending from the edge of the opening towards the chart at the front of the case.

16. A portable vision test chart kit, comprising a hollow case formed of rigid side, end, and back walls, and a removable, rigid, flat, reversible front wall forming a cover member for the case, said case being of substantially greater length than width and being of appreciable depth, means on said removable front wall for detachably mounting a chart on one face thereof, a pair of lamp supports respectively hingedly connected to the case at its opposite ends and adjacent to the bottom thereof, said lamp supports being normally foldable within the case and completely enclosed therein, but swingable to extended positions projecting forwardly at the front of the case between the opposite ends of the removable front wall and the adjacent end walls of the case, a lamp mounted on each of the lamp supports aforesaid and having means for directing and uniformly distributing the light rays therefrom upon the chart when the lamp supports are in their extended positions and the front wall is disposed on the case with the chart facing outwardly thereof, and an electrical circuit in which the lamps are connected for energizing the lamps.

17. A portable vision test chart kit, comprising a hollow case formed of rigid side, end, and back walls, and a removable, rigid, flat, reversible front wall forming a cover member for the case, said case being of substantially greater length than width and being of appreciable depth, means on said removable front wall for detachably mounting a chart on one face thereof, a pair of lamp supports respectively hingedly connected to the case at its opposite ends and adjacent to the bottom thereof, said lamp supports being normally foldable within the case and completely enclosed therein, but swingable to extended positions projecting forwardly at the front of the case between the opposite ends of the removable front wall and the adjacent end walls of the case, a lamp mounted on each of the lamp supports aforesaid and having means for directing and uniformly distributing the light rays therefrom upon the chart when the lamp supports are in their extended positions and the front wall is disposed on the case with the chart facing outwardly thereof, and an electrical circuit in which the lamps are connected for energizing the lamps, in combination with an auxiliary fixation lamp mounted on one of the lamp supports and having means for connecting the same to the electrical circuit aforesaid.

WALTER K. LONG.

REFERENCES CITED

The following references are of record in the file of this patent:

UNITED STATES PATENTS

| Number | Name | Date |
| --- | --- | --- |
| 761,461 | Vom Eigen | May 31, 1904 |
| 960,596 | Spinner | June 7, 1910 |
| 986,236 | Soletcki | Mar. 7, 1911 |
| 1,218,462 | Quade | Mar. 6, 1917 |
| 1,412,632 | Ruebsamen | Apr. 11, 1922 |
| 1,647,195 | Reid | Nov. 1, 1927 |
| 1,692,999 | Siegel | Nov. 27, 1928 |
| 1,874,986 | Harker | Aug. 30, 1932 |
| 1,918,047 | Marchand | July 11, 1933 |
| 1,930,081 | Biller | Oct. 10, 1933 |
| 2,014,266 | Sherbondy | Sept. 10, 1935 |
| 2,185,149 | Hallbauer | Dec. 26, 1939 |